Oct. 30, 1962   H. LUTZ   3,060,762
STEERING GEAR, PARTICULARLY FOR MOTOR VEHICLES
Filed Oct. 21, 1958   2 Sheets-Sheet 1
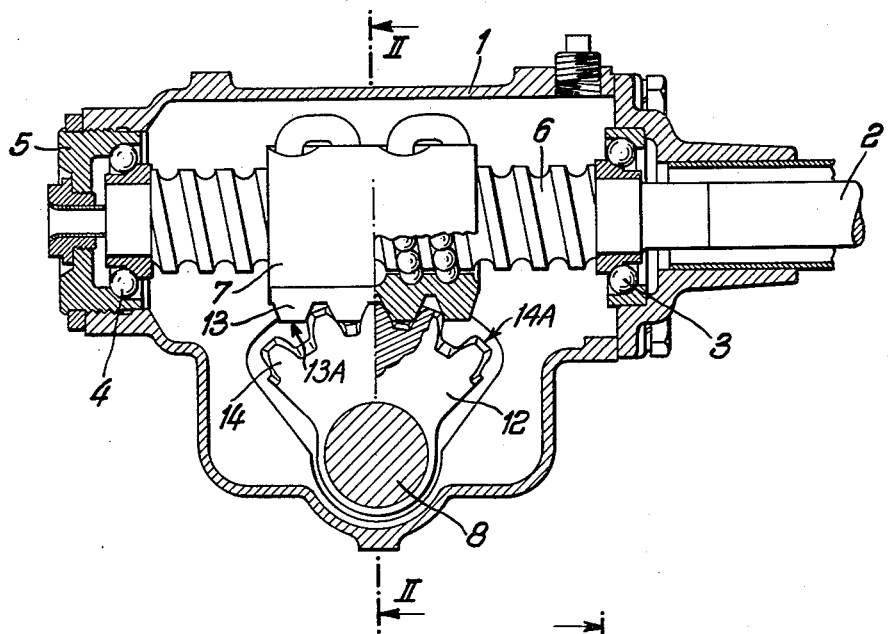
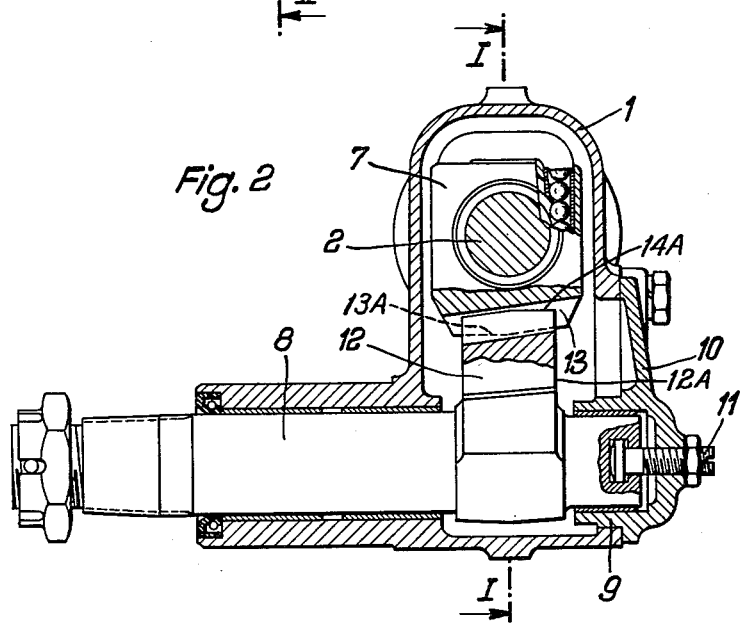
Inventor:
Herbert Lutz

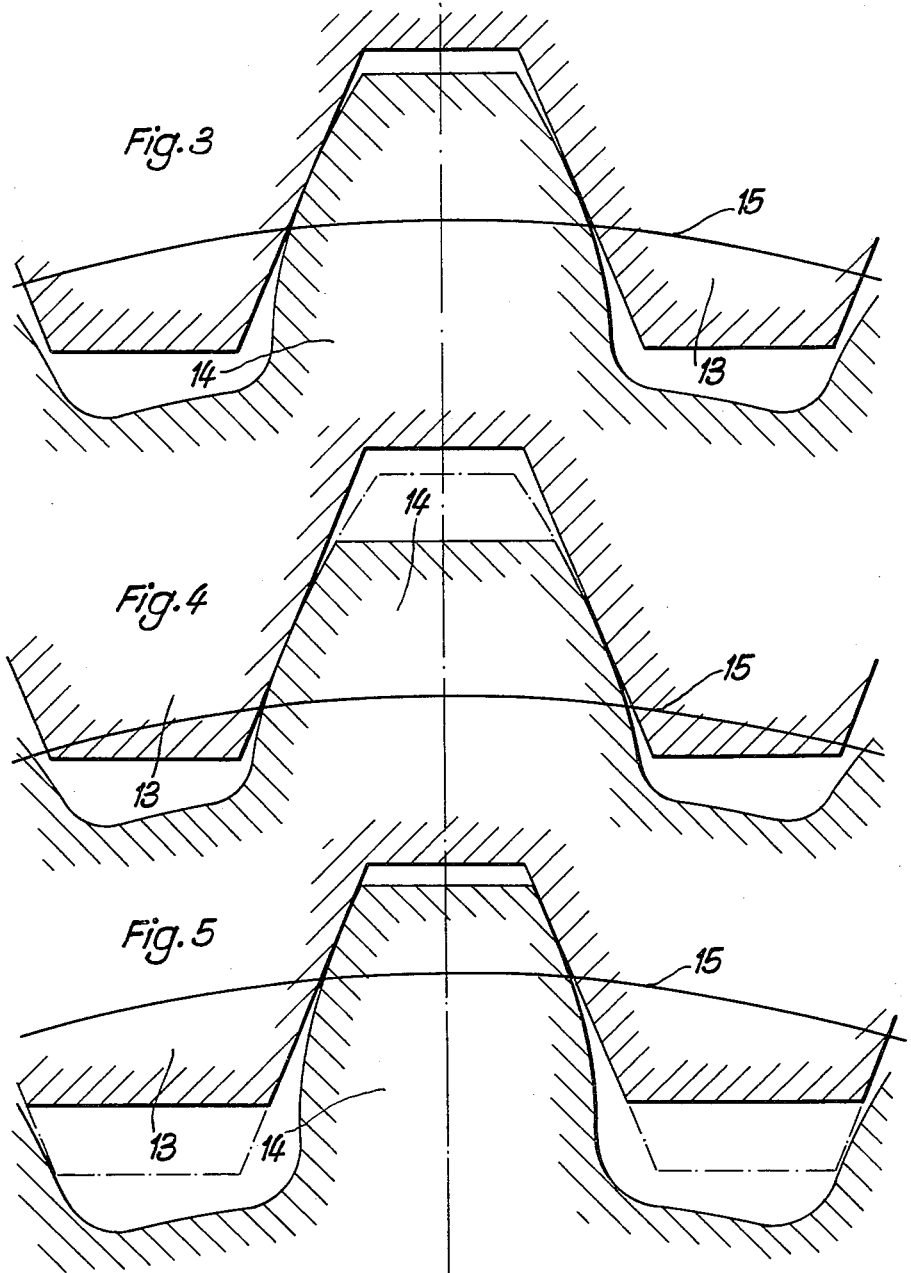

United States Patent Office 3,060,762
Patented Oct. 30, 1962

3,060,762
STEERING GEAR, PARTICULARLY FOR MOTOR VEHICLES
Herbert Lutz, Mannheim-Friedrichsfeld, Germany, assignor to Fulminawerk K.G. Franz Mueller, Mannheim-Friedrichsfeld, Germany
Filed Oct. 21, 1958, Ser. No. 768,684
Claims priority, application Germany Oct. 21, 1957
4 Claims. (Cl. 74—499)

This invention relates to a steering gear, particularly for motor vehicles, having a sector with tapered gear arranged axially on the adjustable rocker cross-shaft meshing with the exterior teeth, in form of a tooth rack, of the nut moved axially on the steering worm.

If the conical cogging is machined according to the usual methods, e.g. in the form of an involute helicoid cogging, the gear tends to become jammed, because with the conical cogging of the rocker cross-shaft the angles of action of the outer and inner tooth profile deviate from that of the mean profile. Jamming and friction of the teeth is caused by the relative movement within the cogging, because the pitch diameters are of different size. Therefore it has been the usual practice to form the teeth during processing in deviation of the normal cogging, in order to prevent jamming of the gear. Correction means for the teeth represent very complicated and, in consequence, expensive special machinery. It is the object of the invention to propose a gear, the conical sector teeth of which are made with a hob-type milling cutter. Meshing with the toothed rack, these teeth insure a satisfactory working of the gear. It is an essential feature of the invention that the conical cogging is machined with a normal hob-type milling cutter and that the heads of the conical cogging and the heads of the tooth rack of the nut are tapered in opposite directions about parallel to the axis of the rocker cross-shaft for about half the length of the teeth. The tapered heads of the cogging, machined on normal hob-type milling cutters, prevent jamming of the cogs. It is tapering that will remove those sections of the teeth that anyway do not permit a satisfactory hobbing. In consequence the shearing strain of the gear, that can never be completely avoided, is reduced. Softer running of the gear results, so that the advantages resulting from the circulation-balls, preferably arranged between nut and steering worm, become fully effective.

The invention is illustrated by way of example in the accompanying drawings, in which—

FIGURE 1 is a steering gear in a longitudinal sectional view of the steering worm according to line I—I of FIGURE 2, FIGURE 2 is a transverse sectional view of the gear according to line II—II of FIGURE 1, FIGURE 3 is a side view of the gear cogging according to line I—I of FIGURE 2 on a greatly enlarged scale, FIGURE 4 is a side view according to FIGURE 3 of the right end side of the sector shown in FIGURE 2, FIGURE 5 is a side view according to FIGURE 3 of the left end side of the sector shown in FIGURE 2.

In the gear housing 1 steering shaft 2 is supported rotatably in known manner by two ball bearings 3 and 4. A sleeve-worm drive 5 screwed into the housing 1 permits axial adjustment of the ball bearing 4. Between bearings 3 and 4 is arranged steering worm 6 on which moves the nut 7 supported on two trains of circulation balls. The nut has a substantially rectangular exterior cross section.

In housing 1, transverse to the steering worm, rocker cross-shaft 8 is supported. Bearing 9 of the shaft 8 has the form of a sleeve portion and is arranged on a cover 10 serving as assembly aperture and forming the end portion of housing 1. A screw 11, penetrating cover 10 concentric to the shaft 8, presses against the end portion of shaft 8 and thus permits axial adjustment of shaft 8. The end portion of shaft 8 projecting towards the exterior is connected in known manner with the steering gear arm, not shown. Within housing 1, steering shaft 8 carries a steering sector 12.

The underside of nut 7 is provided with a toothed rack 13 tapered relative to the axis of steering shaft 8. Sector 12 is a segment of a cone, the base 12A of which faces in the direction of the adjusting screw 11. Sector 12 carries teeth 14 meshing with the complementary teeth 13 of nut 7. The conical teeth 14 are a normal cogging and preferably represent an involute helicoid cogging that is machined on an ordinary hob-type milling cutter. The heads or top faces of the conical teeth 14 as well as the heads of the tooth rack teeth are tapered from about half their length and about parallel to the axis of the steering shaft. As indicated in FIG. 2 the heads or top faces of the gear teeth 13 and 14 are normally slanted at an angle from the axis of the shaft 8. The taper is made so that approximately half of the top faces on one side of the nut teeth, as at 13A, and on the opposite side of the sector teeth, as at 14A, are tapered to lie substantially parallel to the axis of the shaft 8.

FIGURE 3 shows a greatly enlarged sectional view of sector 12 and nut 7 in a position where the teeth of sector and rack reach their relative maximum elevation. Tapering of sector and rack teeth can be easily seen from FIGURES 4 and 5 drawn on the same scale, in which the chain-dotted line indicates the original height of the teeth. Line 15 drawn in each figure is at the same distance from the axis of the steering shaft in each of FIGS. 3 to 5 and points out the wedge-like formation or taper of the sector teeth and of the tooth rack.

The width of the gaps between the teeth at their outer edges is somewhat larger than the width of the tooth gap in the middle of the tooth rack.

I claim:
1. In a steering gear mechanism of the type including a steering shaft having a worm portion, an internally threaded nut on said worm portion in engagement with said worm for axial movement thereon to-and-fro upon rotation of said steering shaft, a rocker cross-shaft extending transversely to said steering shaft and worm portion and a conical gear sector mounted on said rocker cross-shaft, the nut having an external rack portion with the teeth thereof having outer faces extending at an angle in a direction transversely of the rocker cross-shaft, the teeth of said conical gear sector having outer faces extending at an angle to the rocker cross-shaft and in the same direction as the teeth of the rack portion, the teeth of said rack portion and said sector being in engagement for transmitting linear reciprocal motion from said nut to rotate said rocker cross-shaft; the improvement comprising said teeth being shortened and having the outer top faces of said teeth on said sector and on said rack portion tapered in directions outwardly from one another on opposite sides of said gears, said outer top faces of said teeth being aligned in planes substantially parallel to the rocker cross-shaft, the remaining portions of the outer top faces of said teeth on said sector and on said rack portion extending in their normal planes slanted in the same direction with respect to said rocker cross-shaft and on opposite sides of said gears.

2. In a steering gear mechanism according to claim 1, wherein said tapered portion of each of said rack teeth and said conical teeth extend substantially half the width of said teeth.

3. In a steering gear mechanism according to claim 1, wherein said conical teeth tapered portion is located opposite the portion of said rack teeth which extends at an angle to said rocker cross-shaft.

4. In a steering gear mechanism according to claim 1, wherein the spacing between the gear teeth on said rack gear is irregular along the length thereof, the space between said rack gear teeth at each end of said rack being greater than the space between said rack gear teeth at the center of said rack.

References Cited in the file of this patent

UNITED STATES PATENTS

| | | |
|---|---|---|
| 1,820,246 | Preis | Aug. 25, 1931 |
| 2,159,225 | Phelps et al. | May 23, 1939 |
| 2,226,038 | Westcott et al. | Dec. 24, 1940 |
| 2,267,524 | Hawkins | Dec. 23, 1941 |
| 2,315,068 | Matthews | Mar. 30, 1943 |
| 2,463,725 | Stonebraker | Mar. 8, 1949 |
| 2,869,389 | Proefke | Jan. 20, 1959 |
| 2,916,945 | Rittenhouse et al. | Dec. 15, 1959 |
| 2,917,938 | Folkerts | Dec. 22, 1959 |
| 2,922,294 | Wildhaber | Jan. 26, 1960 |
| 2,936,643 | Smith et al. | May 17, 1960 |